United States Patent [19]
Villa

[11] Patent Number: 5,743,327
[45] Date of Patent: Apr. 28, 1998

[54] RADIATOR SYSTEM

[76] Inventor: Philip Ferdinando Villa, Outwood, Lark Rise, East Horsley, Surrey KT24 6TN, England

[21] Appl. No.: 495,510

[22] PCT Filed: Jan. 21, 1994

[86] PCT No.: PCT/GB94/00123

§ 371 Date: Jul. 21, 1995

§ 102(e) Date: Jul. 21, 1995

[87] PCT Pub. No.: WO94/17321

PCT Pub. Date: Aug. 4, 1994

[30] Foreign Application Priority Data

Jan. 21, 1993 [GB] United Kingdom ............ 9301132
Jun. 14, 1993 [GB] United Kingdom ............ 9312221

[51] Int. Cl.⁶ .................................. F24D 19/02
[52] U.S. Cl. .................. 165/55; 165/76; 165/178; 285/351; 285/370
[58] Field of Search ............... 165/53, 55, 67, 165/178, 76; 285/351, 344, 239, 370, 397, 383

[56] References Cited

U.S. PATENT DOCUMENTS

| | | | |
|---|---|---|---|
| 1,835,711 | 12/1931 | Kidd | 165/178 |
| 2,575,685 | 11/1951 | Shugart et al. | 285/383 X |
| 3,348,528 | 10/1967 | White, Jr. | 165/178 |
| 3,398,786 | 8/1968 | McNabney | 165/55 |
| 3,408,479 | 10/1968 | Welch, Sr. | 165/55 X |
| 3,993,334 | 11/1976 | Fridman et al. | 285/370 X |
| 4,844,516 | 7/1989 | Baker | 285/351 |
| 5,378,023 | 1/1995 | Olbrich | 285/351 X |

FOREIGN PATENT DOCUMENTS

| | | | |
|---|---|---|---|
| 2262181 | 7/1973 | Germany | 165/76 |
| 2446450 | 4/1976 | Germany | 165/67 |
| 3026681 | 2/1982 | Germany . | |
| 52797 | 3/1982 | Japan | 165/67 |
| 161395 | 7/1988 | Japan | 165/76 |
| 807039 | 1/1959 | United Kingdom . | |
| 2242247 | 9/1991 | United Kingdom . | |
| 1847 | 2/1992 | WIPO . | |

Primary Examiner—Leonard R. Leo
Attorney, Agent, or Firm—Fay, Sharpe, Beall, Fagan, Minnich & McKee

[57] ABSTRACT

A radiator system in which aluminum extruded sections carrying integral fluid conduits are adjustably supported on a wall and interconnected at the corners of a room by connectors. The connectors incorporate slidable seals to engage in a telescopic fashion with the adjacent ends of the conduits. The extruded sections are clipped into wall mountings and are slidably retained, which facilitates assembly at the corners with the telescopic action of the connectors.

30 Claims, 16 Drawing Sheets

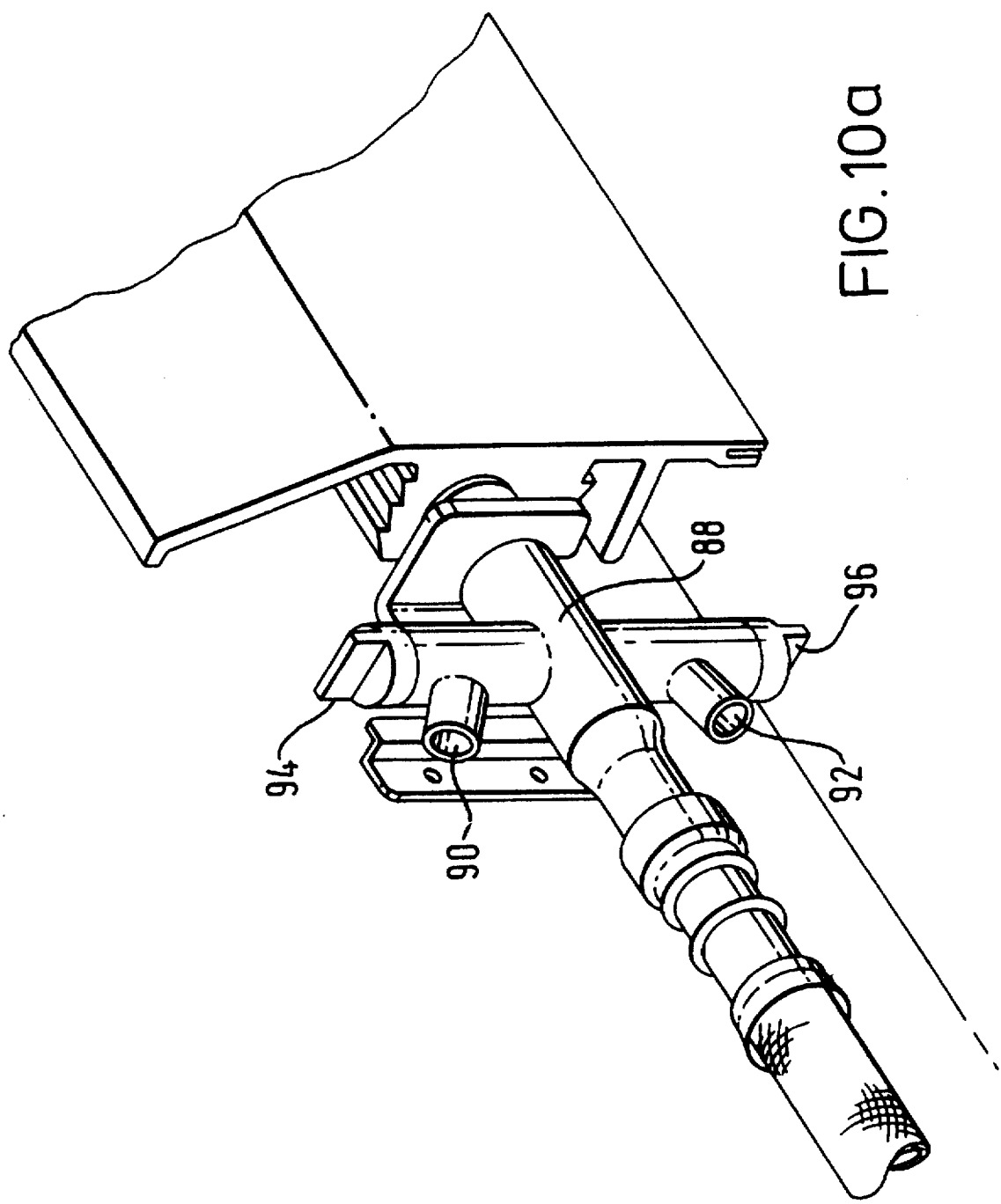

RADIATOR SYSTEM

This invention relates to pipe joints, and particularly, although not exclusively, to a pipe joint for use in a heating system of the kind in which a heat exchange fluid is passed through a network of pipes and/or heat exchange units.

Our pending International Patent Publication No. WO92/01847 describes, inter alia, a space heating system in which an extruded metal panel section incorporating water pipes is adapted to be fitted around the base of the walls of a room so as to form a skirting-type heating system. One of the problems of known heating systems of this type is that long metal sections may expand appreciably, when heated, and thus, in conventional systems, it is common to incorporate special joining units at the corners and indeed, in some cases, there may be a fairly low limit to the possible length of the sections. Alternatively, expansion bellows are sometimes incorporated.

Our above-mentioned patent application provides a system which is considerably improved in this respect because it incorporates special flexible mounting units for the elongate panel sections, which allow for a certain amount of movement towards and away from the wall. As a result, for example, when a number of long lengths extending around the periphery of a room are connected together at the corners, the expansion of the entire assembly is allowed for by flexing of the mounting unit.

Even with such a system, however, the interconnection of the sections at the corners is quite critical using conventional methods and requires considerably greater skills on the part of the installer than the remainder of the system which is specifically designed for very easy installation. In particular, if conventional pipe jointing methods are used, it is necessary for the components to be cut quite accurately and for the installer to be sufficiently competent to make soldered joints (for example).

In systems which employ simpler mounting arrangements, which are cheaper to fabricate, the problems of installation are considerably worse because the mountings may not be sufficiently flexible, or may be too rigidly fixed, to absorb expansion of the entire assembly. Consequently it is necessary to provide some other means to absorb such expansion.

Accordingly, the present invention provides a connector for interconnecting the conduits of a heating panel system, the connector comprising a length of tube having at least one end portion which is adapted to fit into the end of an adjacent conduit and carries at least one circumferentially extending sealing element adapted to form a fluid-tight coupling with the conduit whilst allowing some telescoping movement of the joint.

The other end portion may carry a similar sealing arrangement, or may be screw-threaded (for example) to allow it to be fixed to another part of the assembly.

Preferably, each end or leg of the connector carries of pair of sealing elements which are spaced apart along the length of the tube so as to provide a "self-aligning" effect when the end is inserted in the pipe and, in a preferred embodiment of the invention, the sealing elements comprise 'O' rings. Additional "scraper rings" may also be provided.

Preferably, the end of the tube is made to be a fairly close fit in the pipe and the or each sealing element is retained in an annular recess around the circumference of the tube. In the preferred embodiment of the invention, there are, therefore, two such annular recesses on each leg of the connector and there may also be a third recess positioned between the two sealing elements, which holds a silicon-based lubricant/sealant gel used in assembly.

Preferably, each leg end of the connector is chamfered to ease its insertion in the end of the corresponding tube.

In addition, further circlips or collar devices may be located in grooves on the outside of the connector, at suitable positions to engage the ends of the pipes so as to limit the telescopic movement, relative to the connector, where there is a possibility of "creep" along the floor. Alternatively suitable stop means may be integrally moulded with the body of the connector.

The preferred arrangement is particularly useful when the connector is made right-angled to enable two conduits or skirting panel sections to be interconnected in a corner of a room, since it enables the components to be simply "push fitted" together and the incorporation of the flexible sealing elements and lubricant gel ensures that the joints are well sealed, whilst allowing a sufficient degree of movement to cater for thermal expansion, without requiring the components to be particularly accurately cut to size. Furthermore, since no special mechanical or soldered joint components are required, the two skirting sections can be extended much further into the corner than would otherwise be possible, resulting in a considerably neater installation.

In addition, in a skirting heating system each heating panel may have mounting units which are designed so as to allow for some variation in position of the sections relative to floors and walls, and thus the use of the tubular connectors according to the present invention provides a useful "automatic self-aligning" feature for the whole system, when connected between adjacent conduits in each corner. This will bring the tops of the two skirting sections into alignment with one another, even if the mounting units are not all fixed at exactly the same level.

According to a second aspect of the present invention, there is provided a radiator assembly comprising a plurality of elongate panels each having at least one longitudinally extending heating or cooling tube on its rear surface, the panels being arranged parallel with one another so as to form a rectangular assembly and having interconnecting means for the ends of the heating tubes at each end of the assembly. The interconnecting means may comprise a manifold arrangement or separate connecting tubes looped between the heating tubes.

Preferably each panel is extruded from aluminium or other suitable non-ferrous material and the tubes may be plain or lined with copper.

In a preferred embodiment of this second aspect of the invention, a plurality of mounting members provided at the rear of the assembly are interconnected by support means which extend transversely of the heating tubes and support the panels by means of their mounting flanges, so as to hold the assembly together. Further mounting devices, or single mounting brackets of known type, may be connected to the rear of the support means, to facilitate mounting the entire assembly on a supporting surface such as a wall. The support means preferably comprises either separate elongate metal strips or plates covering a substantial part of the area of the radiator. Each mounting member preferably comprises at least two interengaging portions, a first portion adapted for attachment to a wall or the like and a second portion which is slidably retained in the first portion.

The mounting members directly supporting the panel preferably engage the flanges of the panel, in such a way as to provide an impact-absorbing effect. The engaging means may comprise a pair of mutually opposed resilient wing-like members which fit between the flanges with a small amount of "lost-motion".

It will be appreciated that such an assembly can be mounted either "horizontally" or "vertically" against a wall i.e. with the tubes running horizontally or vertically.

According to a third aspect of the invention there is provided a radiator assembly adapted for floor mounting and comprising at least one pair of elongate panels which are mounted in a back-to-back relationship on each side of an upstanding support member by means of a mounting arrangement of the type described.

Some embodiments of the invention will now be described, by way of example, with reference to the accompanying drawings, in which:

FIG. 10a is a perspective view of the assembly of FIG. 10.

FIG. 13b is a cross-section on the line A—A of FIG. 3a;

FIG. 14c is a top plan view of the radiator of FIG. 14a;

FIG. 15b is a cross-section on the line A—A of FIG. 15a;

FIG. 17b is an inside elevational view of the manifold of FIG. 17a;

FIG. 17c is a cross-sectional view taken on the line C—C of FIG. 17a;

Figure 1:
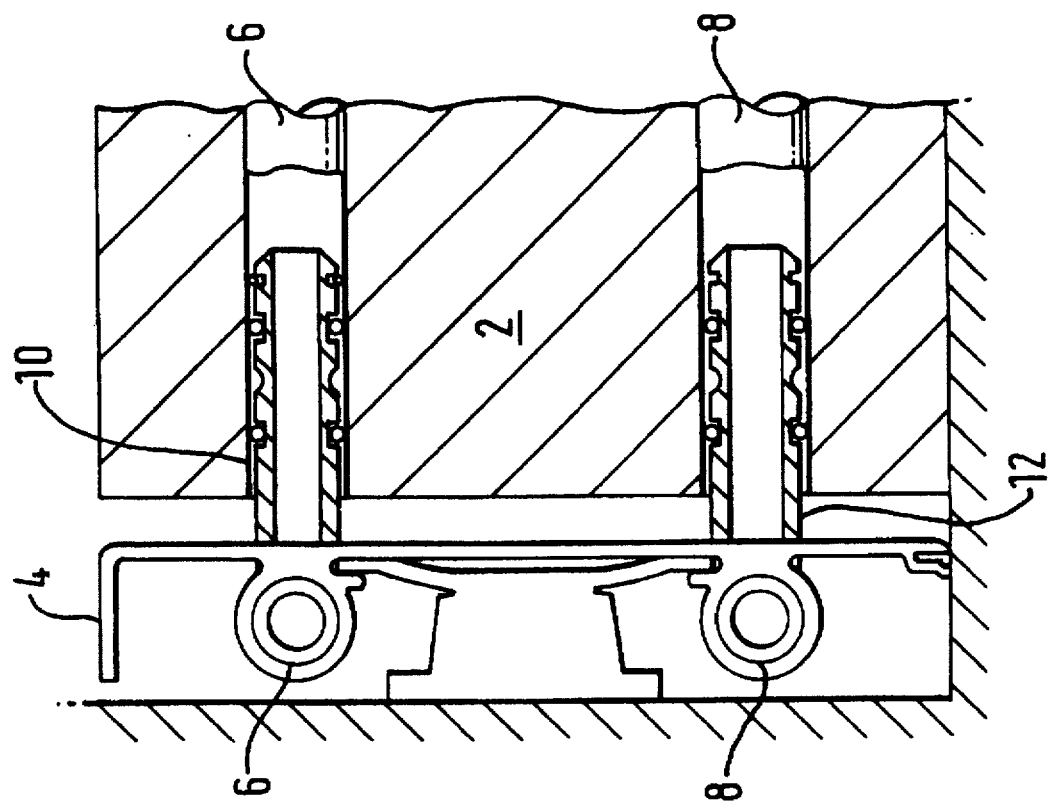
FIG. 1 is a partially sectioned elevational view of an assembly incorporating tubular pipe connectors in accordance with the invention.

Referring to the drawings, FIG. 1 illustrates how the connectors of the invention are used to interconnect two adjacent sections 2, 4 of a skirting heating system where they meet in the corner of a room. As will be seen from the figures, each section incorporates parallel "flow" and "return" tubes 6, 8 which are, respectively, interconnected by right-angled connectors 10, 12 push fitted into their ends, as illustrated in FIG. 1.

Figure 2:
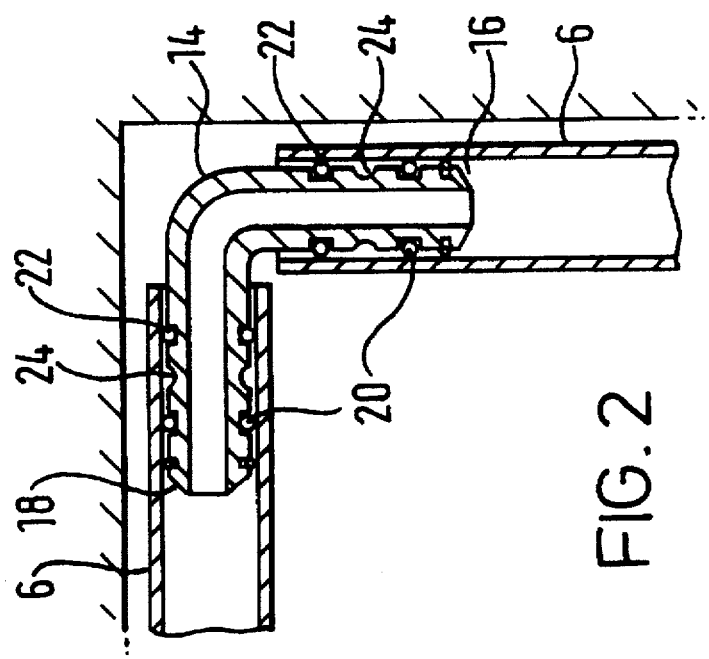
FIG. 2 is a horizontal cross-section taken along the line 2—2 of FIG. 1.

The shape of the entire right-angled connector is shown more clearly in FIG. 2 from which it will be seen that the connector 14 comprises a right-angled tube which is of such a diameter as to be a fairly close fit in the ends of the pipes 6 which are being connected. In order to facilitate assembly of the system, the ends 16, 18 are chamfered and it will also be noted that each leg of the connector is made sufficiently long to extend a reasonable length into the end of the tube 6, so that the exact cut length of the sections 2, 4 is not critical.

Each leg is formed with a pair of spaced apart annular channels 20, 22 in each of which there is seated an 'O' ring of flexible material, such as neoprene, which is of a suitable size to ensure a good seal between the connector and the inside surface of the tube. It will be appreciated that the incorporation of two spaced apart seals not only ensures good sealing, but also aids in aligning the parts on assembly ensuring that they do not become jammed as a result of misalignment.

A further annular recess or depression 24 is located approximately midway between each pair of 'O' rings and forms a lubricant channel for a lubricant/sealing compound which may, for example, be a silicon-based compound. In use, the compound is applied fairly liberally to the end of the connector and around the recess 24 before the ends of the connector and the tubes are pushed together and thus it will be appreciated that, in the assembled condition, a good seal will be obtained between the parts whilst allowing a certain degree of movement, as required for example, by thermal expansion.

Figure 3:
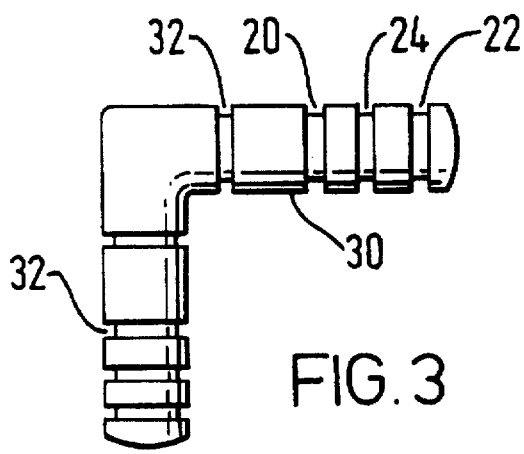
FIG. 3 is a plan view of an alternative form of right angled connector.
Figure 4:
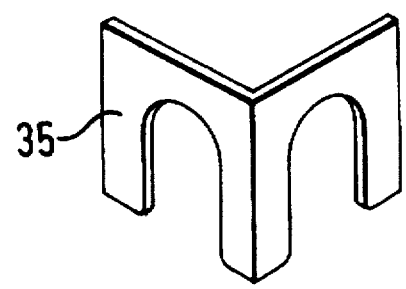
FIG. 4 is a perspective view of a stop member adapted for mounting on the connector of FIG. 3.

Referring to FIG. 3 of the drawings, a slightly modified form of right angled connector is shown which, in addition to the annular grooves 20, 22, and 24, also incorporate an additional pair of grooves 32, one on each side of the angle, which are adapted to receive a slip-on "retaining clip" 35 of the kind illustrated in FIG. 4. This clip drops over the corner, in a manner to be described in more detail below, so as to act as a stop for the adjacent tube sections to which the connector is mounted.

Figure 5:
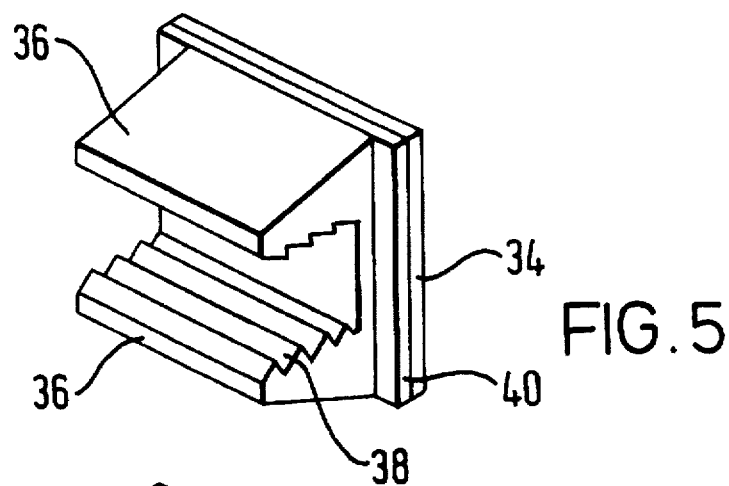
FIG. 5 is a perspective view of a first part of a wall mounting member for use with the heating system of the invention.
Figure 6:
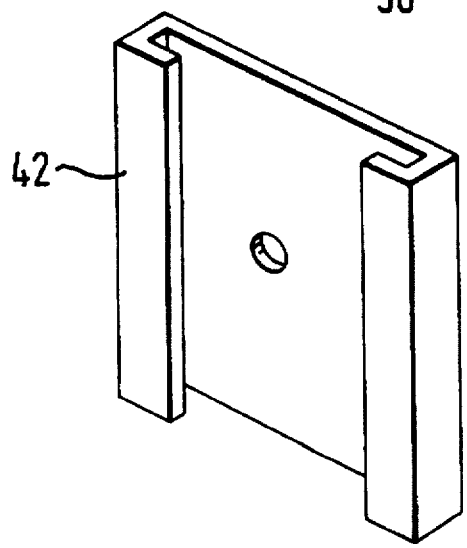
FIG. 6 is a perspective view of a second part of the wall mounting member.

FIGS. 5 and 6 illustrate an adjustable mounting member which is particularly adapted for skirting heating panels connected together by the connector of the invention. This comprises a backplate 34 whose front surface carries a pair of forwardly projecting, spaced apart parallel members 36, whose facing surfaces 38 are grooved, so as to form a "socket member" of the mounting, in a manner to be described below.

The side edges 40 of the member 34 are adapted to fit into the complementary flanged edges of backplate 42, FIG. 6, so that the two parts are relatively slidable, in a vertical direction. This allows for adjustment of the mounting of the system, in use. As a variation of the design shown in FIGS. 5 and 6, it is also possible to make the flanges of the backplate 42 deeper, and to provide a layer of resilient material 39 on the rear surface of the member 34, such as a rubber pad, so as to facilitate assembly of the end connections and to allow the mounting to absorb impacts, or movements due to expansion, in the completed assembly, as will be described in more detail below.

Figure 7:
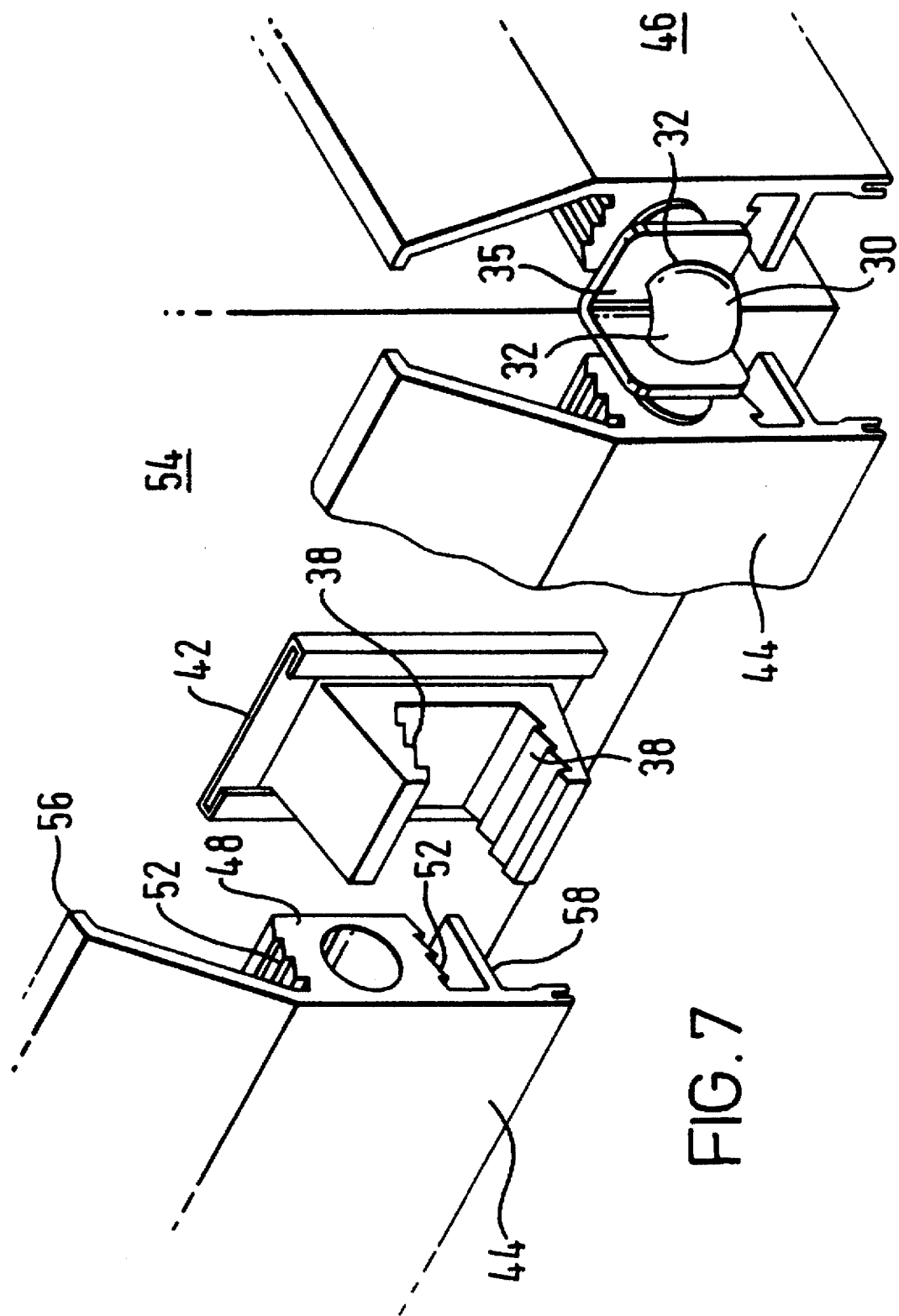
FIG. 7 is a partly broken away view of a heating system incorporating the components of FIGS. 3 to 5, at the position of an outside corner.

Referring now to FIG. 7, which illustrates a typical skirting heating assembly utilising the components described above, the heating panels themselves comprise extruded sections 44, 46, preferably of aluminium, incorporating a longitudinally extending projection 48, on the rear surface, which is formed with an internal bore 50 for the heating fluid (usually water).

The upper and lower surfaces 52 of the projection 48 are formed with parallel grooves so as to cooperate with the correspondingly grooved surfaces 38 of a mounting member 34, of the kind described above with reference to FIG. 5, which is mounted on the wall 54 to which the system is attached, by means of a backplate 42 (FIG. 6 above). The grooves 38 and 52 are preferably formed with a very small pitch, such as 1.5 mm, so as to allow fine adjustment of the position of the skirting panel 44, relative to the surface of the wall 54, to allow for unevenness in the wall, and in addition, the vertically slidable relationship between the members 34 and 42 also allows the system to take up unevenness in the floor surface.

In order to align the skirting panel as accurately as possible against the wall, and to maintain it in a vertical orientation, the panel is formed with an upper rearwardly extending flange 56, which encloses the top of the assembly in a conventional fashion, and also, an additional rearwardly extending flange 58, nearer to the base of the panel, to act as a spacer for the lower portion of the panel.

The righthand side of FIG. 7 illustrates the interconnection between two panels 44 and 46 at an external corner of the assembly. Silicone lubricant is applied around the end portions of a connector 30, and particulary over the 'O'-rings 20 and 22 (FIG. 2) before it is inserted into the open ends of the bores 50 of adjacent panels. A right angled retaining clip 35, as illustrated in FIG. 4, is then inserted into the grooves 32 of the connector, by pressing it down from above the joint, and it will be clear from the drawing, that the position of the retaining clip is such that it will then act as a "stop member" to limit movement of the panels 44 and 46, due to expansion or creep in the longitudinal direction.

Figure 8:
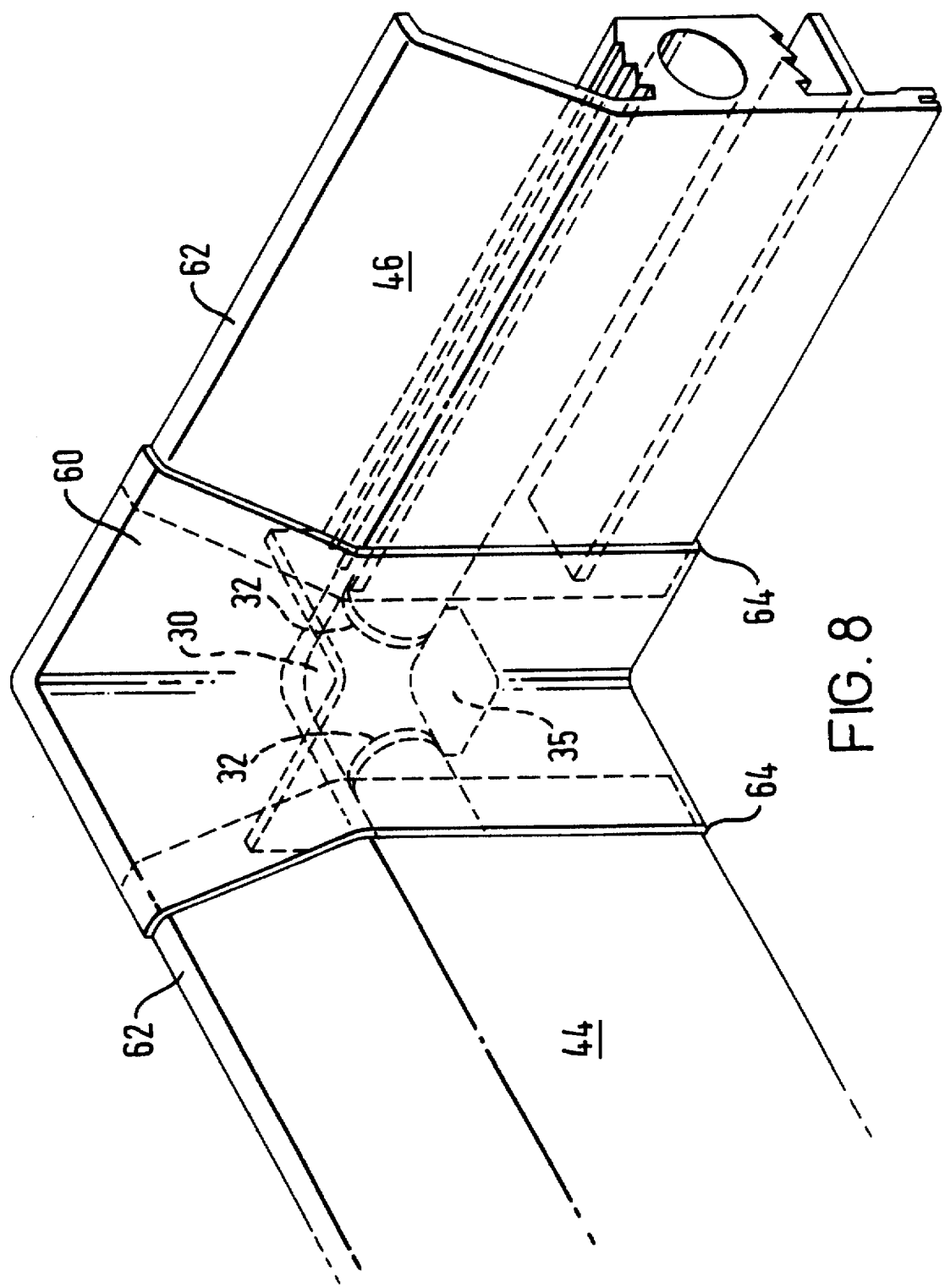
FIG. 8 is a perspective view of an inside corner.

FIG. 8 illustrates schematically, a similar kind of arrangement as applied to an inside corner, with the corresponding positions of the connector 30, the grooves 32 for the retaining clip, and the retaining clip 35 itself in its mounted position, being indicated in dashed lines in the Figure. In this case, the system is shown in fully assembled condition, including a plastic cover member 60 which fits over the corner, by clipping around the upper and lower edges 62 and 64 of the two adjacent panels, so as to enclose the corner joint. As will be clear from the drawing, the cover member overlaps the ends of the adjacent panel sufficiently to allow for some movement of the panels, as a result of thermal expansion.

Figure 9:
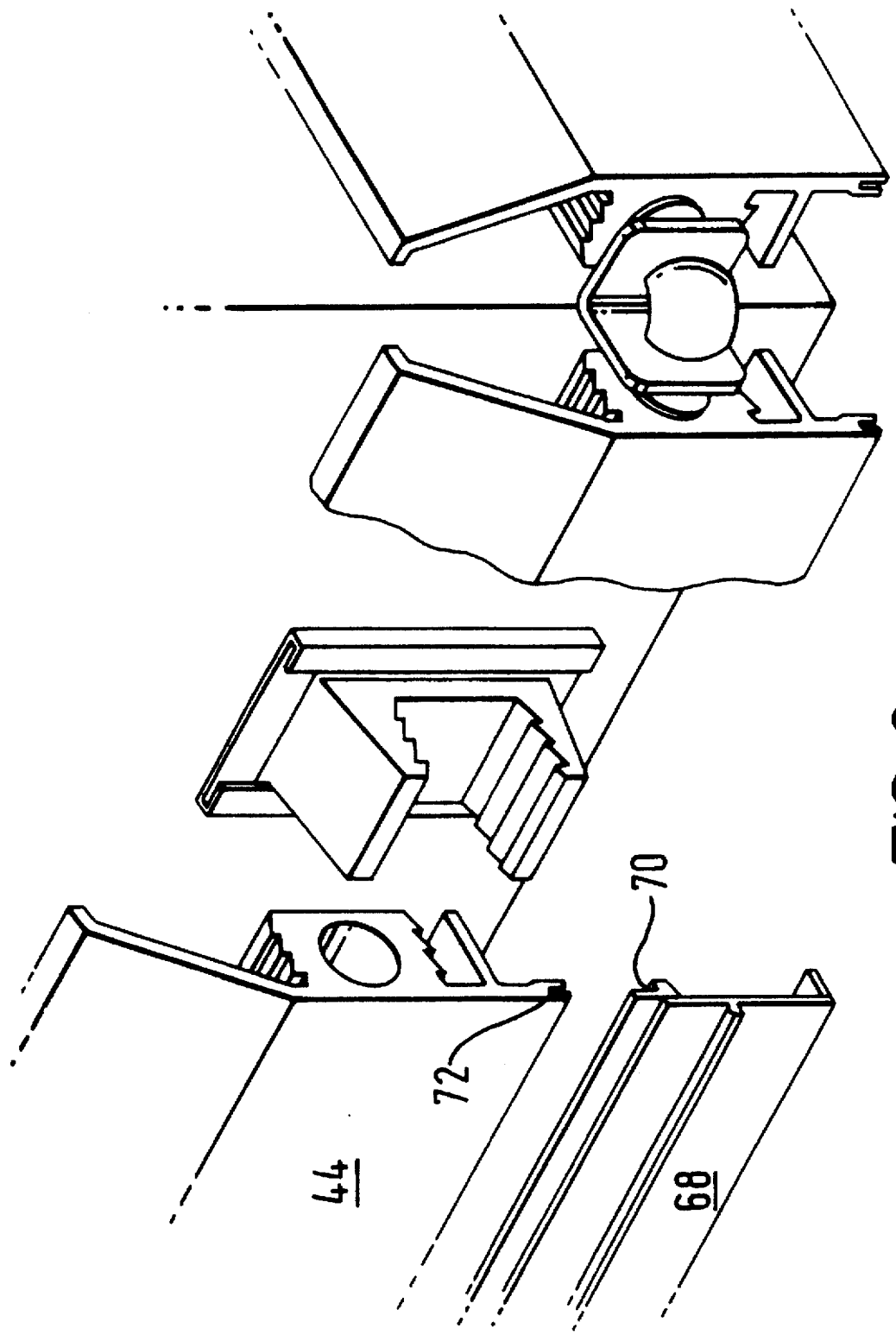
FIG. 9 is a perspective view of a modified form of the system of FIG. 7.
Figure 9A:
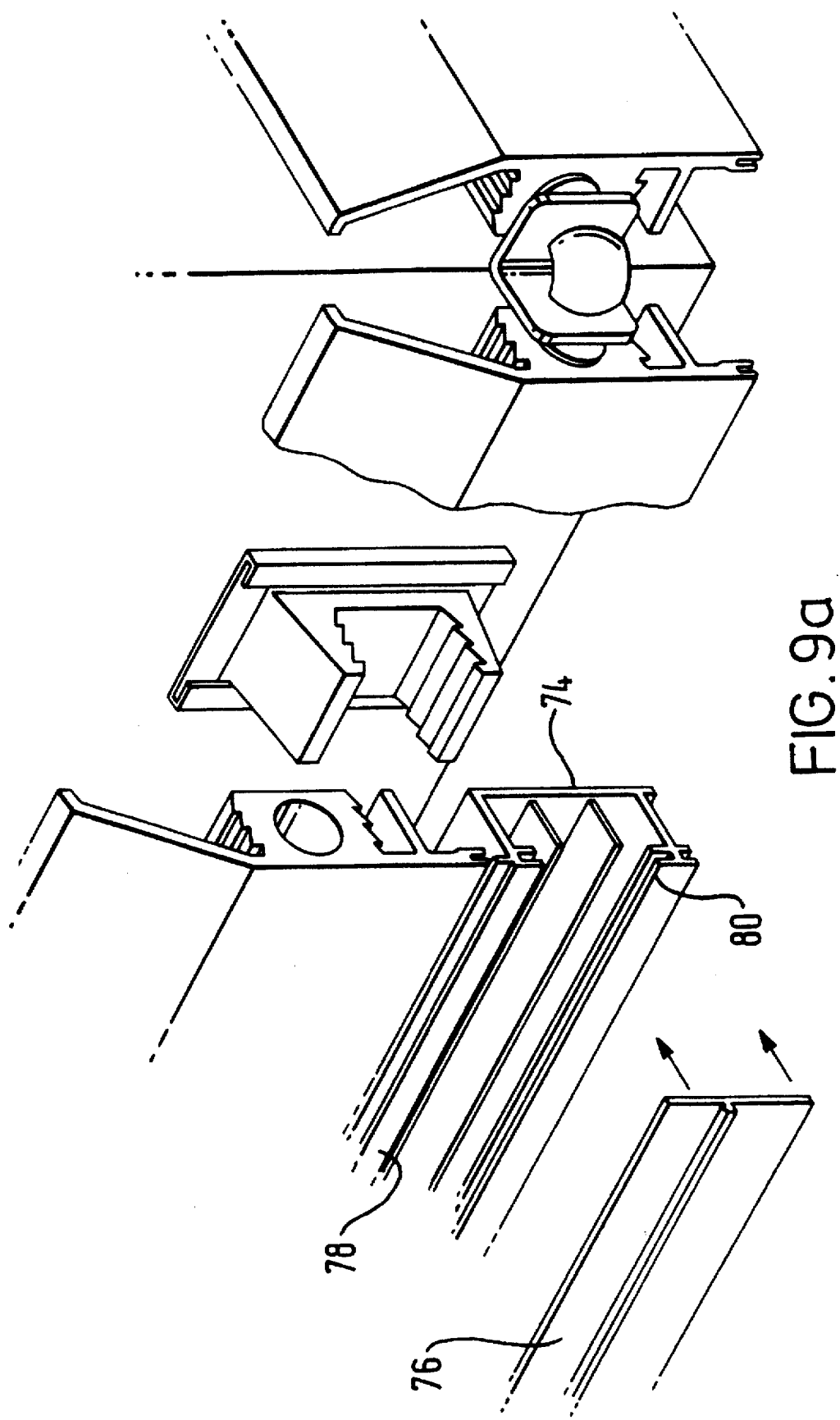
FIG. 9a illustrate a modified form of the arrangement of FIG. 9.

FIG. 9 illustrates an additional modification of the skirting panel assembly, in an arrangement which otherwise corresponds to that of FIG. 7. In order to increase the surface area of the panel, and thus the heat dissipation, or to allow additional space beneath the assembly, to create service ducts, an extension panel 68 is provided, comprising an elongate strip having an upstanding flange 70 along its upper edge, which fits into a corresponding slot 72 extending along the lower edge of the panel 44. In this way, the vertical height of the entire assembly is increased, and as illustrated in FIG. 9a, a similar arrangement can be used to provide a conduit compartment 74 in the lower part of the assembly, incorporating longitudinally extending compartments, in which electric wiring (for example) can be inserted. In the arrangement illustrated, a cover strip 76 is mounted in mutually opposed channels 78, 80 at the top and bottom of the front opening of the section 74, the upper channel 78 being sufficiently deeper than the lower channel 80 to allow the cover panel 76 to be lifted in and out, for access to the compartments.

Figure 10:
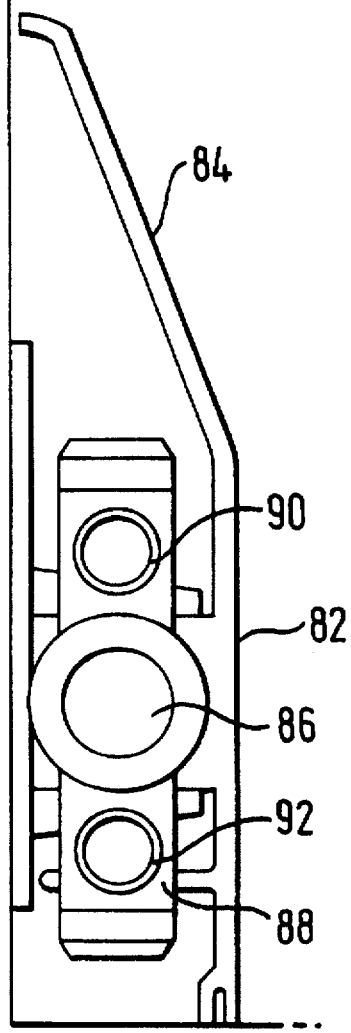
FIG. 10 is an end view of alternative "skirting profile" with an end connector attached.

FIG. 10 illustrates an alternative skirting panel 82, the outer face of which is sloped as indicated at 84, to provide a more compact section, with a single heating channel 86 being incorporated in the lower part of the assembly, and the Figure also illustrates the arrangement of an end connector 88 for the assembly, which provides for draining and bleeding the assembly, after it has been installed. This is illustrated more clearly in the perspective view of FIG. 10a, from which it will be seen that connector 88 is provided with a valve 94 at the upper end, which can be opened to bleed air from the outlet 90, and a further valve 96 at the lower end which can be opened to drain the system through the outlet 92.

It will be appreciated that, once all the parts have been assembled, no other fixings are required for the connectors since they are held in position by the other parts of the system and, at the same time, they act to "self-align" the adjacent skirting sections.

Although the exemplary embodiment of the invention has been described as a right-angled connector, it will easily be appreciated that the connector could be straight or made in a variety of different angles to suit different applications, and may be moulded or machined from a suitable plastics or metal material to simplify manufacture.

Figure 11:
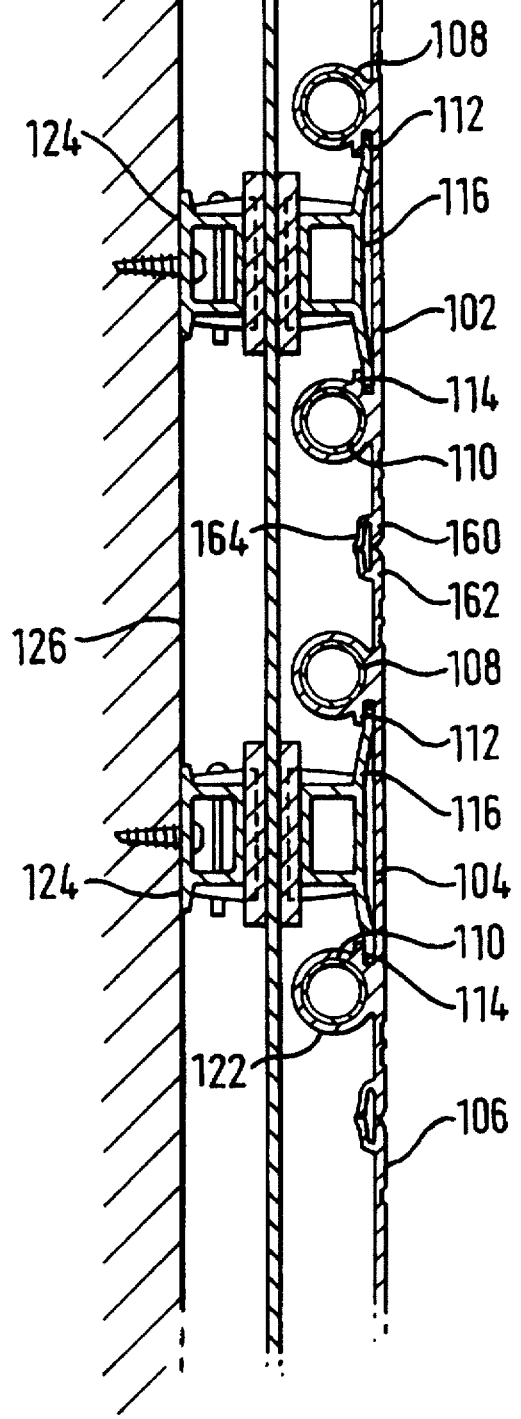
FIG. 11 is a vertical cross-section through a first type of multi panel radiator in accordance with the invention.

FIG. 11 shows a multi-panel radiator assembly comprising three extruded aluminium panels 102, 104, 106 mounted one above the other, each being of similar construction to the "skirting" panels described in detail with reference to FIGS. 1 and 2 of our International Patent Publication No. WO92/01847 and comprising an aluminium extrusion with water tubes 108, 110 (which may be copper lined) on the rear surface. The panels are preferably held with their adjacent edges 160, 162 in alignment by means of flat metal strips 164 which fit in facing grooves in the edges. These carry inwardly directed flanges 112, 114 by means of which they co-operate with winged mounting brackets 116. The construction of the bracket 116 once again corresponds generally to the corresponding arrangement described in our above mentioned prior patent application.

Instead of the rearmost portion 120 of the bracket assembly 116 being connected directly to a wall, however, each bracket is mounted on a vertically extending metal support strip 122 so as to connect it to the corresponding bracket 116 immediately above and/or below it so as to effectively hold the whole assembly together. The rear surface of the strip 122 carries further mounting assemblies 124, by means of which it is connected to the supporting wall 126, and each assembly 124 may typically comprise a "cut-down" version of the standard mounting bracket 116, i.e. in which the ends of the flexible wings have been cut off, the remaining portion of the wing section being screwed "face-on" to the wall. It will of course be appreciated that there will be at least two such supporting strips 22 for each radiator assembly spaced apart across its width.

Figure 12:
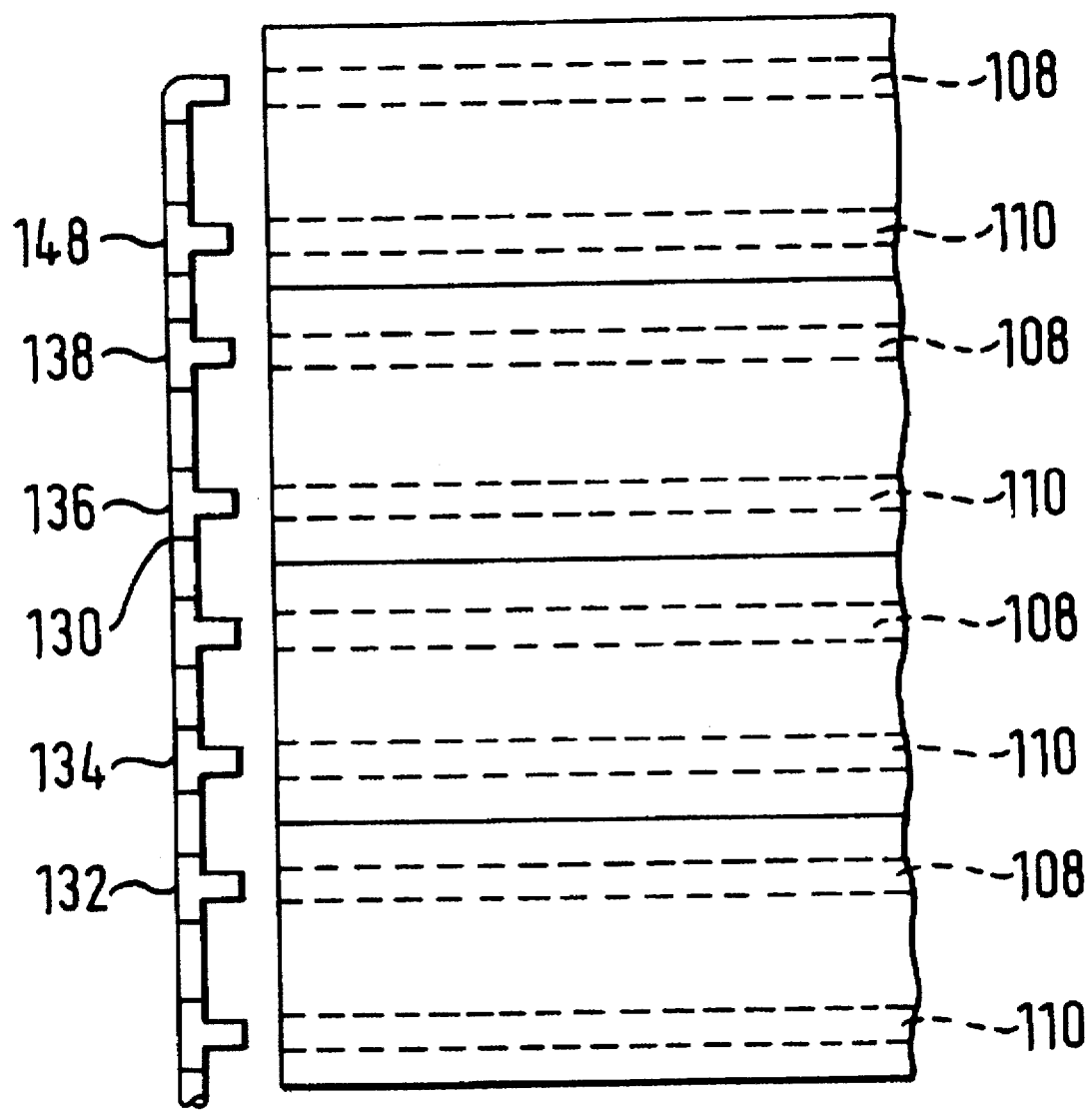
FIG. 12 is a schematic exploded view of one end of a radiator assembly.
Figure 13A:
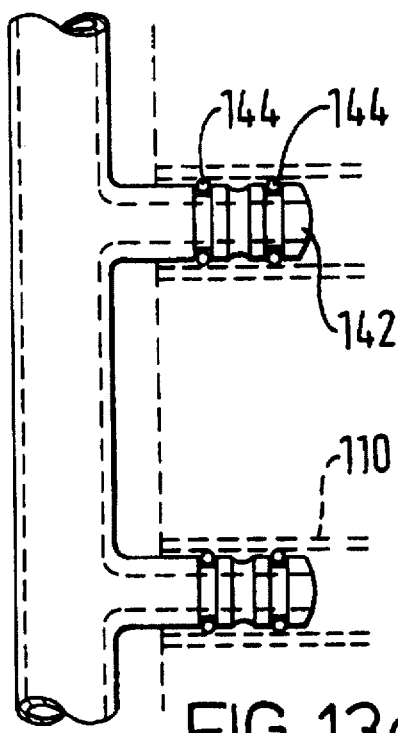
FIG. 13a is an enlarged view of a part of a manifold of the radiator of FIG. 2.
Figure 13B:
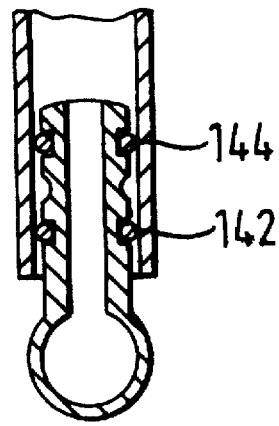

The ends of the tubes 108, 110 are connected together by a manifold 130, FIG. 12 which is typically fabricated from copper tube and comprises a series of interconnected "T-pieces" 132–140 or elbows as appropriate. These are formed with push-fitting plug portions 142, as illustrated in the enlarged view of FIG. 13a, which fit into the end of the tubes 108, 110 and for this purpose the ends 142 may also carry a pair of co-operating O-ring seals (or equivalent sealing members) 144 fitted into suitable annular grooves.

Figure 13C:
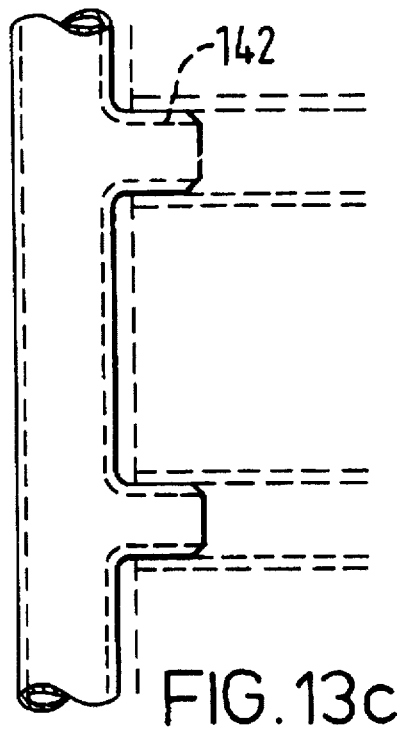
FIG. 13c shows an alternative form of manifold.
Figure 13D:
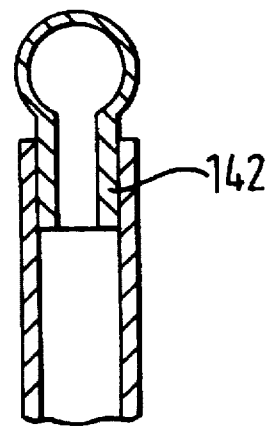
FIG. 13d is a cross-section on the line B—B of FIG. 3c.

As illustrated in FIGS. 13c and 13d, in an alternative arrangement the connectors 142 of the manifold are formed with plain ends for conventional capillary soldered joints.

Figure 14A:
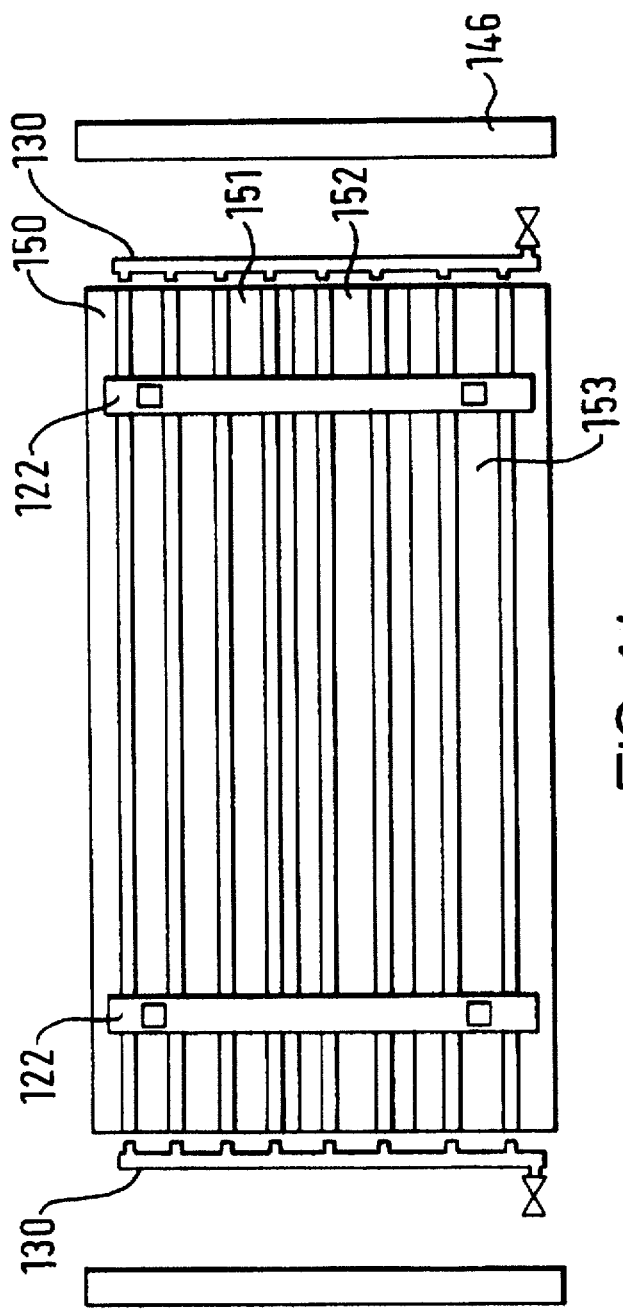
FIG. 14a is a rear view of a radiator assembly.

FIG. 14a illustrates a complete radiator assembly viewed from the rear, which incorporates four panel sections 150–153 fitted one above the other, each of which has a pair of heat exchange tubes 108, 110 on its rear surface. The corresponding ends of all the tubes are connected together by manifolds 130 and the assembly is mounted by means of a pair of vertically extending metal strips 122 as described in more detail above with reference to FIG. 11.

Figure 14B:
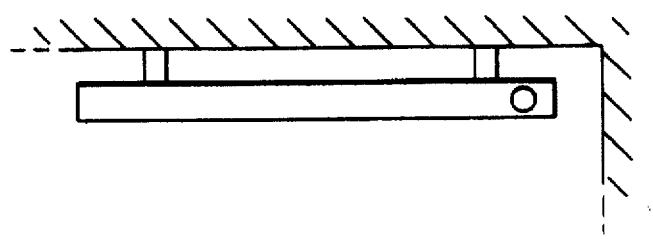
FIG. 14b is an end view of the assembly of FIG. 4a mounted in an operative position on a wall.
Figure 14C:

In order to cover the pipework forming the manifold, a generally U-section cover 146 may be provided, as illustrated diagrammatically in the plan view of FIG. 14b.

Although in the arrangement described the manifold 130 is shown as fabricated from copper tube, it will be appreciated that it could advantageously be made in a number of other ways. For example it could be moulded or fabricated in a similar form in a suitable rigid plastics material such as acetal resin, and in this case it could be formed with a "box" section so as to provide an integral end trim for the radiator rather than requiring a separate cover member 146 as illustrated. It is also envisaged that instead of the manifold incorporating projecting plug members to fit into the ends of the radiator tubes, the ends of the radiator tubes may be left projecting from each panel section when it is manufactured, and the manifold will then be provided with co-operating sockets into which the projecting ends can be sealed. As a further alternative, using a manifold of the latter type and panel sections with plain ends as shown, individual short connector tubes may be provided having one end adapted to fit into the radiator tubes whilst the other fits into the corresponding manifold socket.

Figure 15A:
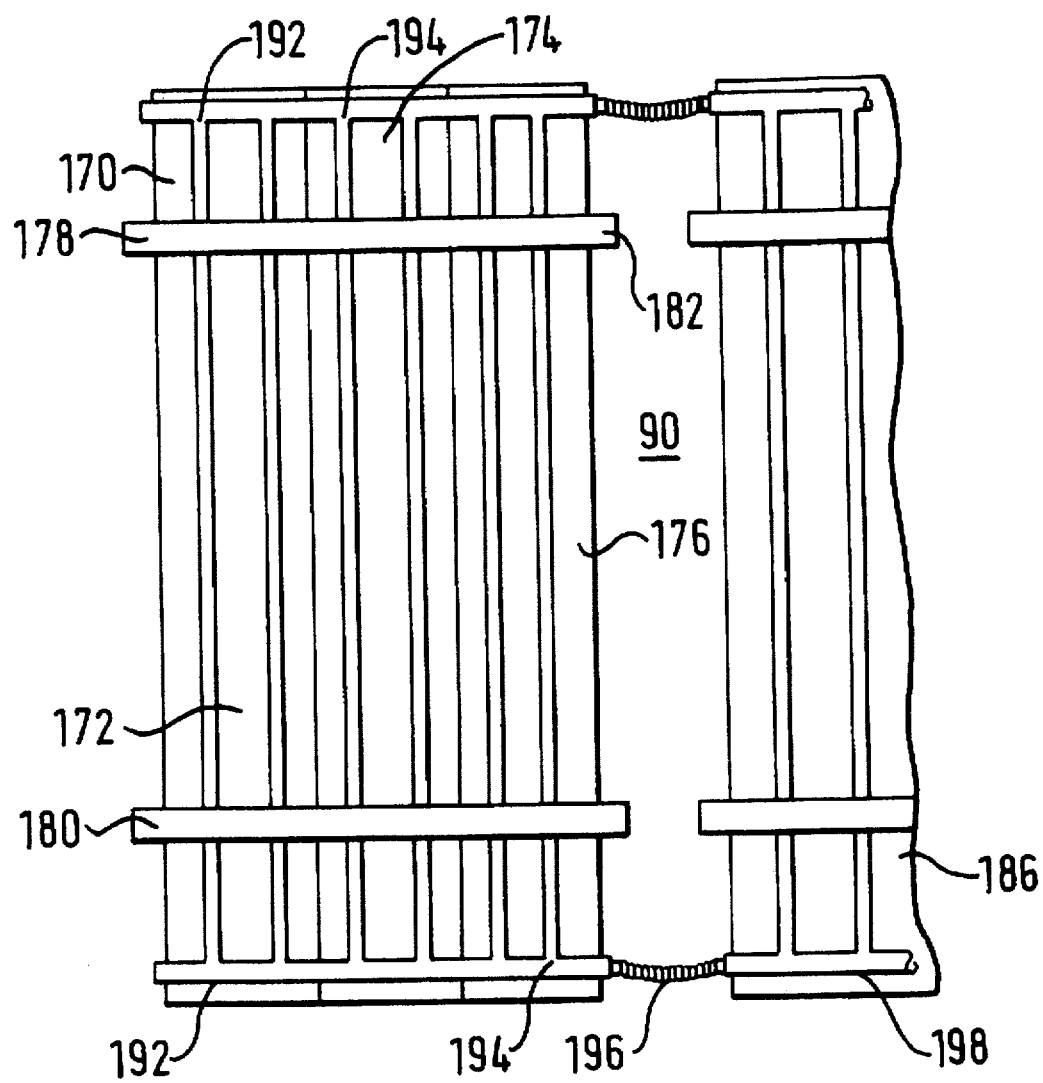
FIG. 15a is an elevational view of a second type of radiator assembly.

Referring to FIG. 15a, a rear view of a radiator construction 170 is illustrated, which is particularly adapted to fit closely to a wall so as to form an unobtrusive "cladding" effect. In this arrangement the individual sections 172, 174, 176 are arranged to run vertically and are connected together by horizontally extending metal or plastic straps 178, 180 which extend beyond the width of the assembly as illustrated at 182 and 184, to allow a simple screw fixing to the wall.

As shown, a further radiator assembly 186 may be mounted adjacent the assembly 170, and is spaced apart from it to allow easy fixing. A cover panel 190 is used to conceal the intervening fixings and connectors.

In order to allow the panels to extend from floor to ceiling, the ends of the heating tubes are preferably cut away as illustrated at 192 so that a manifold 194 can be mounted on the rear surface of the panel without being visible from the front. This is connected to the manifold 198 of the adjacent panel 186 by a flexible hose connector 196.

Figure 15B:
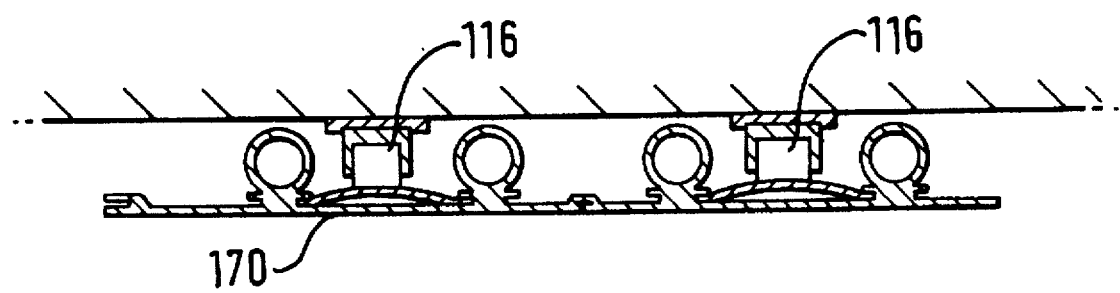

As illustrated in FIG. 15b the panel is mounted on its support strips 178, 180 by means of mounting bracket assemblies 116 in the same way as described above with reference to FIG. 11. Sound and thermal insulation may also be placed in the voids behind the panels to improve the acoustic and heat radiating properties of the assembly.

Figure 16:
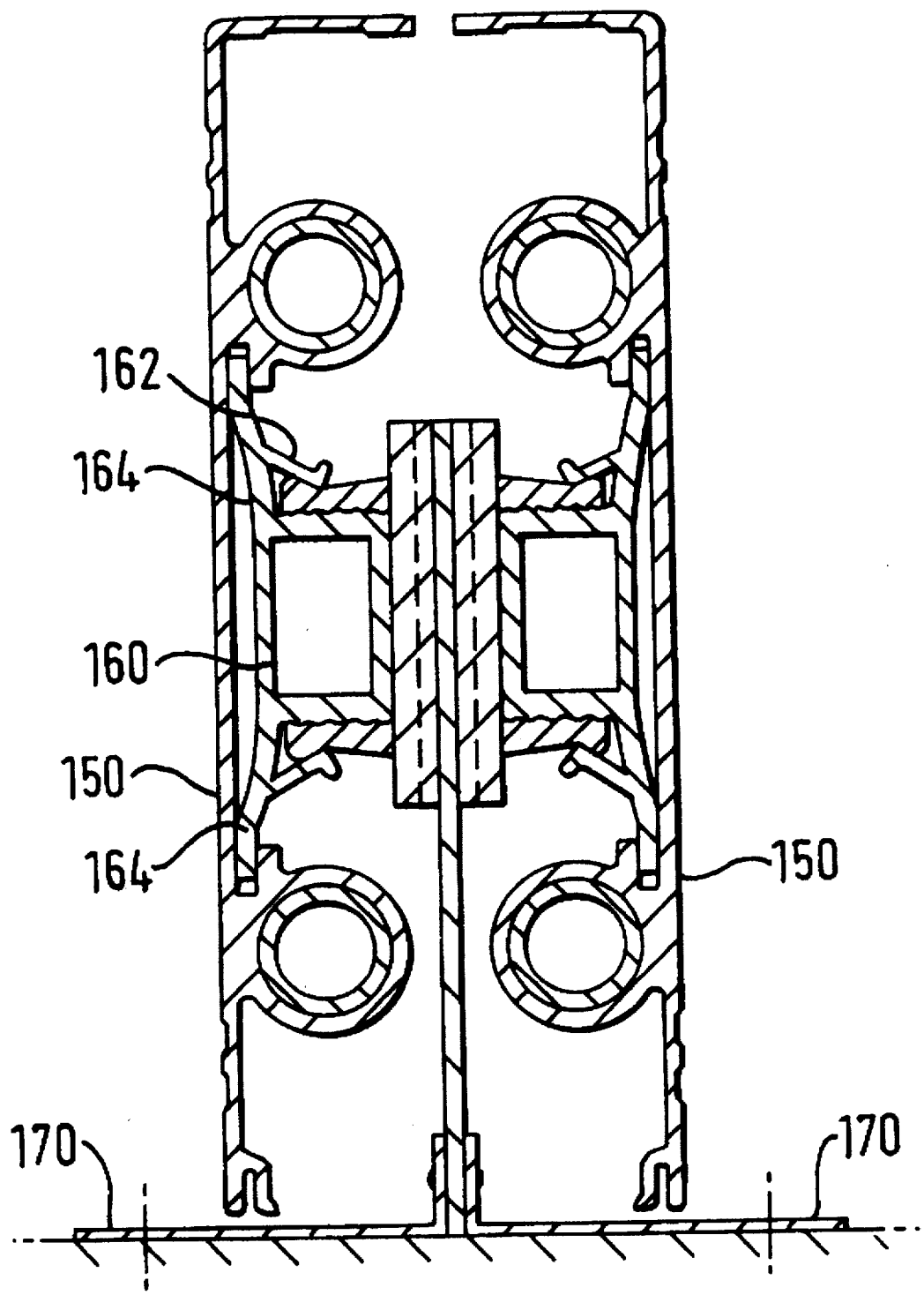
FIG. 16 is a vertical cross-section through a third type of radiator in accordance with the invention.

FIG. 16 illustrates a floor mounted version of the radiator system in which the heating panels 150 are mounted "back-to-back" against a supporting member 152 by means of mounting bracket assemblies 160. Once again these are basically similar to those shown in our above mentioned patent application but as illustrated they may also incorporate additional locking projections 162 at the rear of the flexible wings 164 which ensure that they are securely locked to the rest of the assembly.

The vertical plate 152 is mounted as illustrated on floor brackets 170 so that it can be located in any convenient position, and the use of the mounting bracket assemblies 160 allows the vertical position relative to the floor to be adjusted, so as to increase the heat convection effect through the centre of the unit and to allow the edge of a floor covering, such as carpet, to be inserted beneath the edge of the panel to hide the floor brackets.

Figure 17B:
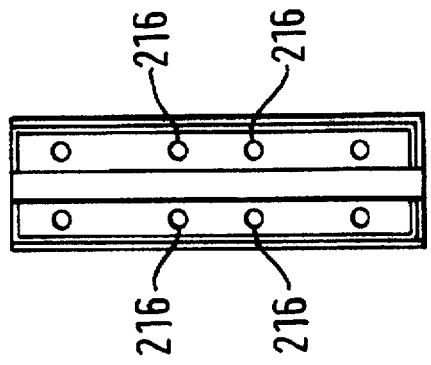
Figure 17C:
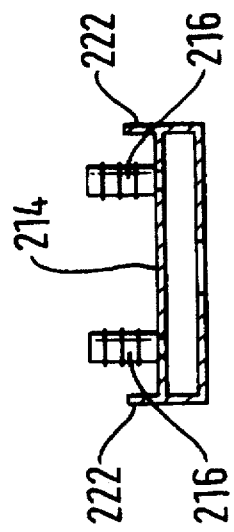
Figure 17A:
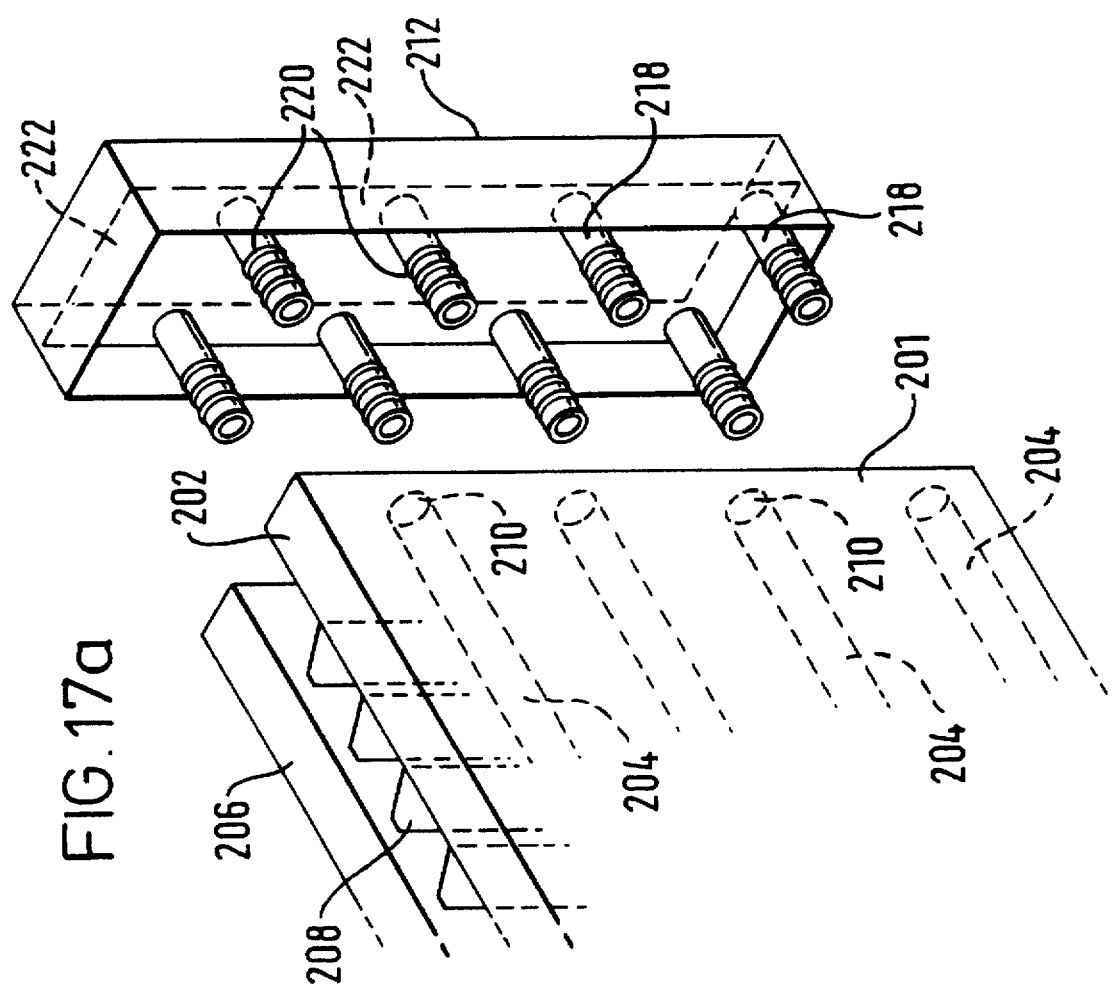
FIG. 17a is a perspective view of a manifold for a radiator assembly.

FIG. 17a illustrates a further form of radiator assembly, in which a plurality of elongate extrusion 201, 202, formed with internal conduits 204 for heating fluid, are connected together in an edge-to-edge array, so as to form a "panel radiator". In the embodiment shown, the arrangement comprises a "double" radiator, with further panels 206 being attached behind the panels 201, 202, by means of interconnecting "fins" 208 which increase the convection effect between the panels.

The open ends 210 of the conduits are interconnected by means of a manifold 212 which comprises an elongate hollow housing, as will be clear from the cross-sectional view of FIG. 17c, one face 214 of which is formed with an array of threaded holes 216 in positions corresponding to the end 210 of the tubes.

Each of these holes carries a connector 218 which comprises a tube carrying sealing 'O'-rings 220, so that they are push fit into the ends of the tubes 210. The face 214 is also surrounded by a flange 222, by means of which the manifold is fixed in position, for example by means of screws, over the ends of the radiator assembly, and thus the manifold performs the function of holding the assembly together, as well as forming the fluid connections between the panels.

Figure 18:
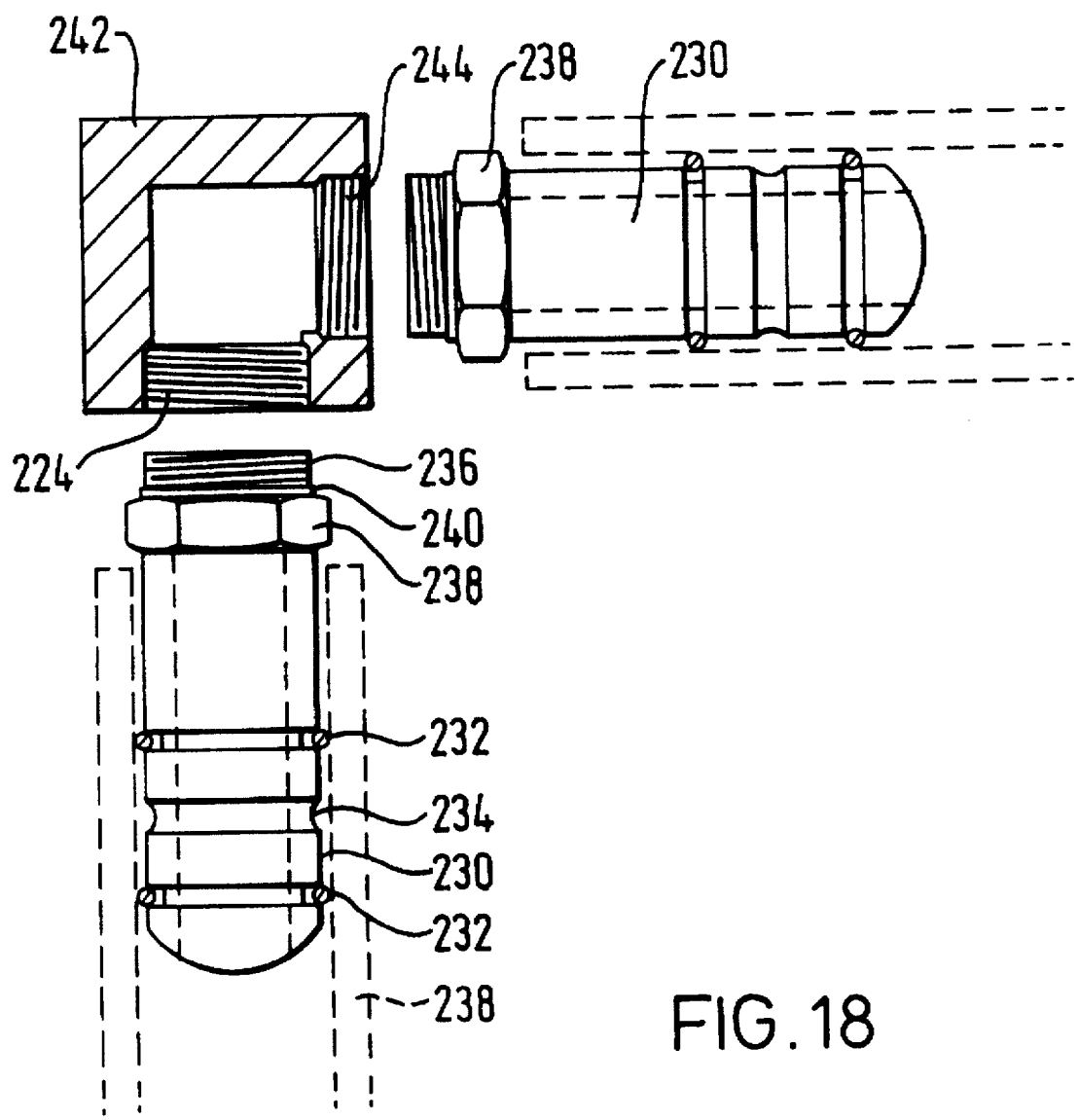
FIG. 18 is a partially sectioned view of an alternative form of connector system.

FIG. 18 illustrates a modified form of corner connection system, particularly useful with the skirting panel radiators of the kinds shown in FIGS. 7 to 10, which utilises similar connectors to those used in the manifold of FIG. 17. In this case, the individual connectors 230 again comprise short lengths of tube with spaced apart 'O'-rings 232 and an intermediate annular recess 234 for retaining lubricant/sealing compound which is used on assembly. This end is inserted into the open end of conduit 238 of the heating panel, indicated in dashed lines in the drawing, and is of sufficient length to allow the connector to "telescope", relative to the conduit, so as to be movable in the direction of the arrow A, for fixing purposes, by a generous amount without the 'O'-ring seals coming too near the end of the tube.

The outer end of the tube 230 is threaded, as indicated at 236, with a hexagonal "nut" formation just inboard of the thread, and a sealing washer 240, of known type, is positioned over the threaded end.

A connector block 242 is formed with a pair of communicating threaded bores 244, arranged at right angles with one another, and as will be clear from the drawing, this enables the two connectors 230 to be independently attached to the connector block 242, and thus provide an easier method of assembly, than is possible with an integrally formed right-angled member.

It will also be appreciated that the "nut" 238 on the end of the tube, forms an integral "stop means", which prevents excessive movement of the skirting panels, once the assembly has been installed, due to any "creep effect".

It will also be appreciated that the connecting block 242, and one of the connectors 230, could be preassembled, before the connector is inserted into the end of the tube to be connected, which reduces the amount of work required to be carried out in the restricted space of the corner, and it will also be understood that a "compound" connector could be integrally formed, to include one tubular connector 230, and a "connecting block" 242, as a single plastic moulding. This would provide a connector with a "male" end portion carrying a circumferentially extending sealing element or sealing elements, and a "female" end, having a threaded bore which extends at right angles to the bore of the tube.

Although the connections have been described as threaded connections, it will also be appreciated that "bayonet" or circlip type connections may be substituted for these.

Figure 19:
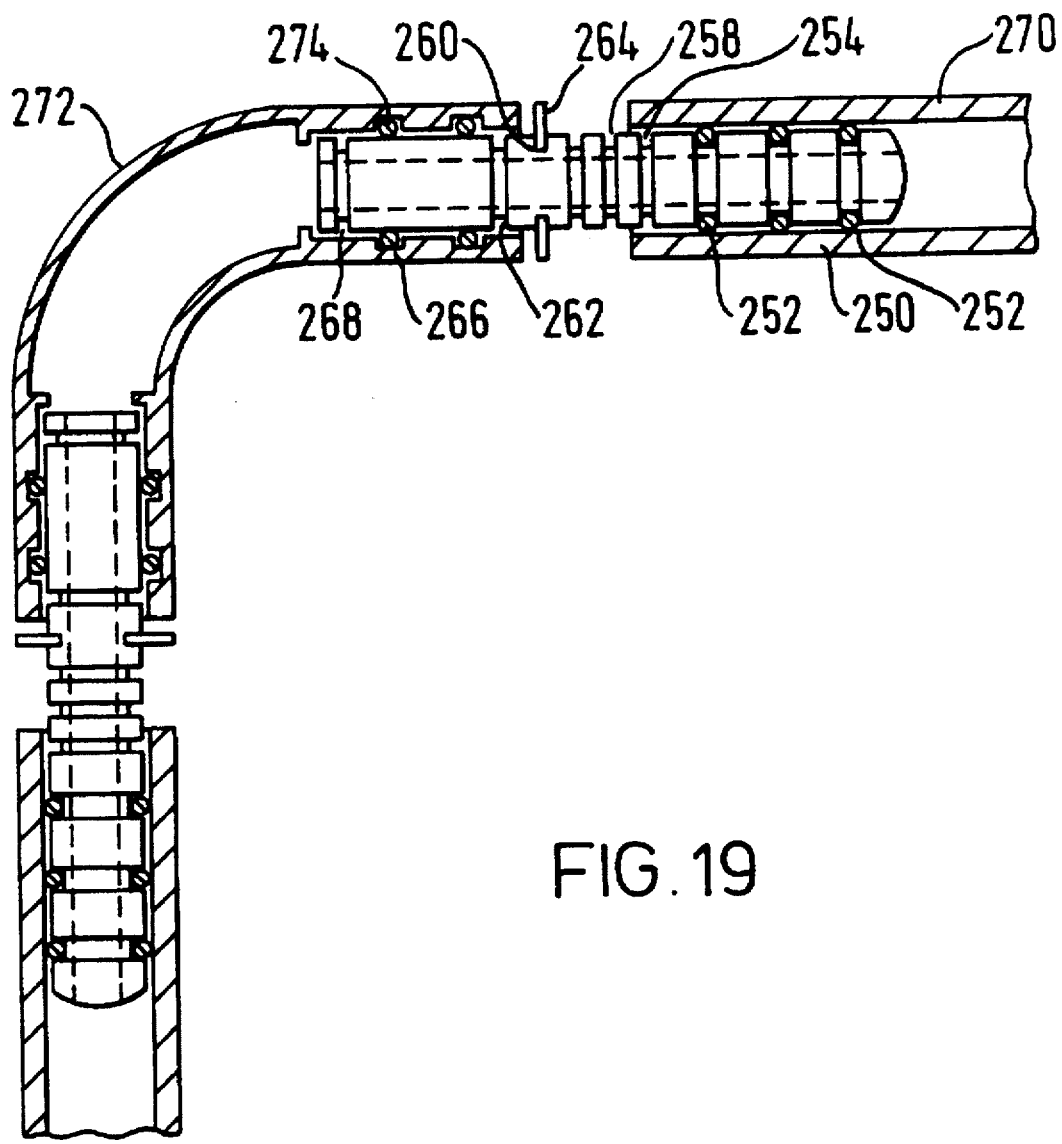
FIG. 19 is a partially sectional view of a further connector device.

FIG. 19 illustrates a further connector arrangement which also facilitates assembly by utilising a telescopic action. A tube 250 is provided with annular seals spaced apart along one end portion, and a series of annular recesses 254-262 spaced at regular intervals along its middle portion to allow a circlip type stop member 264 to be adjustably sealed on it.

The other end 266 of the tube may also be provided with annular seals in recesses, or as in the example illustrated, these may be incorporated in a further connector member, described in more detail below. The extreme end is provided with a recess 268 for assisting in manipulating the connector. In use, the connector is pushed right into the conduit 270 with only a small portion carrying the recess 268 protruding. A further conduit or tube forming an elbow such as that illustrated at 272, to which the conduit 270 is to be connected, is then offered up into position and the tube 250 is partially extracted from the conduit 270 (by engaging a suitable tool with slots 268 etc) so as to project into the end of the conduit 272. As shown the interior of the conduit 272 carries sealing rings 274 in internal recesses, and these act to seal the joints with the conduit 272. An end stop 276 may also be provided inside the bore of the conduit 272.

After the tube has been inserted up to the end stop 276, the circlip 264 is positioned in a suitable one of the slots 254-262 to prevent the tube from subsequently retracting into conduit 270 whilst leaving a suitable space for any expansion of the member carrying the conduit. It will also be appreciated that, depending on the exact cut length of the panel being connected, two spaced apart circlips may be inserted to avoid excessive play in the joint.

It will also be appreciated that conduit member 272 may comprise the central portion of a connector assembly forming an elbow or it may of course comprise another heating fluid conduit.

I claim:

1. A radiator system comprising a plurality of elongate panels each incorporating a longitudinally extending conduit for heating or cooling fluid, at least one mounting member comprising a first part for attachment to a supporting surface, and a second part which co-operates with the panel so that the panel is slidably movable at least in the longitudinal direction; a connector for interconnecting the conduits of the system, the connector having at least one tubular end portion which is adapted to fit slidably into the end of one of the conduits, and carries at least one circumferentially extending sealing element adapted to form a fluid-tight coupling with the conduit, and at least one seating on said connector for a detachable stop member which seating is located so as to retain the stop member at a position which is spaced from the at least one tubular end portion of the conduit after assembly so as to allow some free motion to take up thermal expansion, while limiting the maximum degree of interengagement between the connector and the conduit.

2. A radiator system according to claim 1 in which the end portion carries a pair of sealing elements which are spaced apart so as to provide a "self-aligning" effect when inserted in the conduit.

3. A radiator system according to claim 2 in which the end portion is formed with a pair of spaced apart annular recesses for sealing elements, and a third annular recess, positioned between said pair of recesses, for retaining a lubricant/sealant gel which is applied during assembly.

4. A radiator system according to claim 1 in which the sealing elements are 'O' rings or sealing rings of other suitable cross-section.

5. A radiator system according to claim 1 in which the connector is formed with an annular recess to receive and locate each sealing element.

6. A radiator system according to claim 1 in which the connector is angled for making connections between two heating panels which are at a corresponding angle, and has two portions carrying sealing elements.

7. A radiator system according to claim 6 in which the stop member comprises a right-angled plate, each leg of which is formed with a slot to fit over one portion of said angled connector.

8. A radiator system according to claim 1 in which the stop member comprises a circlip or collar device and said seating comprises an annular recess on said at least one tubular end portion.

9. A skirting heating system comprising a radiator system according to claim 1 in which the panels are interconnected in an end-to-end relationship.

10. A panel radiator comprising a radiator system according to claim 1 in which the panels are arranged parallel to one another to form a rectangular array.

11. A panel radiator according to claim 10, in which the adjacent ends of the conduits of the panels being interconnected by means of a manifold comprising an elongate housing, arranged to extend along an end of the array, said connectors being attached to the manifold.

12. A radiator assembly according to claim 10 in which the panels are arranged in substantially the same plane with their long edges adjacent to one another.

13. A radiator assembly according to claim 10 in which the panels are arranged in a pair or a series of pairs in a "back-to-back" relationship with mounting means arranged between them.

14. A radiator according to claim 10, in which the panels are arranged in substantially the same plane with their long edges adjacent to one another, further comprising at least one elongate support strip which extends transversely of the length of the panels and is adapted for connection to a wall, the or each support strip carrying at least two mounting members.

15. A radiator assembly according to claim 10, in which the panels are arranged in substantially a common plane with their long edges adjacent to one another, further comprising an elongate support strip which extends between each pair of panels and extends parallel to them, and also includes support means for mounting on a floor, whereby the vertical position of the panels can be adjusted, relative to the support strip, by virtue of the mounting means.

16. A radiator system according to claim 1 in which the panels are extruded from aluminum.

17. A radiator system according to claim 1 in which the tubes are lined with copper.

18. A radiator system according to claim 1 in which the mounting means includes a mounting member comprising two interengaging portions, the first portion being adapted for attachment to a wall or other upstanding support means and the second portion being adapted for attachment to the radiator assembly itself, the second portion being slidably retained in the first portion so as to allow positional adjustment at right angles to the length of the panel.

19. A radiator system according to claim 18 in which the first portion of the mounting member incorporates opposed retaining flanges for engaging with corresponding edges of the second portion, and the second portion is provided with a layer of resilient material on a surface which faces the first portion so as to take up impacts and/or expansion of the panels.

20. A radiator system according to claim 18 in which the panel is formed with a longitudinally extending housing on its rear surface having an internal bore which forms said conduit, and said second portion of the mounting member comprises a pair of facing projections forming jaws which fit around said conduit housing so that the panel is slidable in the mounting, in the longitudinal direction.

21. A radiator system according to claim 18, in which the panel is formed with a longitudinally extending housing on its rear surface having an internal bore which forms said conduit, and said second portion of the mounting member comprises a pair of facing projections forming jaws which fit around said conduit housing so that the panel is slidable in the mounting, in the longitudinal direction, the surface of said member also being formed with parallel cooperating ribs or grooves so as to allow adjustment of the distance of the panel from the supporting surface.

22. A radiator system according to claim 18, in which the panel is formed with a longitudinally extending housing on its rear surface having an internal bore which forms said conduit, and said second portion of the mounting member comprises a pair of facing projections forming jaws which fit around said conduit housing so that the panel is slidable in the mounting, in the longitudinal direction, and in which said portion comprises a pair of mutually opposed resilient wing members and a back of each panel includes a pair of longitudinally extending, mutually opposed parallel flanges, the wings and the flanges being adapted to engage one another with some lost motion to allow adjustment in at least one direction in the plane of the panels.

23. A radiator system comprising:

a plurality of elongate panels each comprising a longitudinally extending conduit through which a fluid can flow;

at least one mounting member comprising a first part for attachment to a supporting surface and a second part which cooperates with one of said panels;

a connector for interconnecting the conduits of the radiator system, the connector comprising at least one tubular end portion which is adapted to fit slidably into an end of one of said conduits;

a set of spaced seatings defined on said at least one tubular end portion; and, a detachable stop member which selectively engages one of said set of spaced seatings of said connector for limiting the distance of interengagement between said connector and said conduit.

24. The radiator system of claim 23 wherein said connector is angled to form an elbow joint.

25. The radiator system of claim 23 wherein said detachable stop member comprises at least one circlip or collar and wherein each seating of said set of spaced seatings comprises an annular recess.

26. The radiator system of claim 23 wherein said connector has two legs and wherein said detachable stop member comprises a plate member having an aperture which fits over each leg of said connector.

27. A radiator system comprising:

a plurality of longitudinally extending spaced conduits through which a fluid can flow;

a connector for interconnecting two of said plurality of conduits, said connector comprising at least one tubular end portion which is adapted to fit slidably into an end of one of said two conduits;

a set of spaced seatings defined on said at least one tubular end portion; and, a detachable stop member which selectively engages one of said set of spaced seatings of said connector for limiting the distance of interengagement between said connector and said conduit.

28. The radiator system of claim 27 wherein said connector is angled to form an elbow joint.

29. The radiator system of claim 27 wherein said detachable stop member comprises at least one circlip or collar and wherein each seating of said set of spaced seatings comprises an annular recess.

30. The radiator system of claim 27 wherein said connector has two legs and wherein said detachable stop member comprises a plate member having an aperture which fits over each leg of said connector.

* * * * *